United States Patent [19]

Weir et al.

[11] 4,423,007
[45] Dec. 27, 1983

[54] REMOVAL OF RADIUM FROM AQUEOUS SULPHATE SOLUTIONS

[75] Inventors: Donald R. Weir; Ian M. Masters, both of Fort Saskatchewan; Manfred Neven, Saskatoon, all of Canada

[73] Assignee: Sherritt Gordon Mines Limited, Toronto, Canada

[21] Appl. No.: 283,318

[22] Filed: Jul. 13, 1981

[30] Foreign Application Priority Data

Aug. 22, 1980 [CA] Canada ................................. 358965

[51] Int. Cl.³ ............................................. C01F 13/00
[52] U.S. Cl. ...................................................... 423/2
[58] Field of Search .......................................... 423/2

[56] References Cited

U.S. PATENT DOCUMENTS

| | | | |
|---|---|---|---|
| 1,154,230 | 9/1915 | Bredt | 423/2 |
| 2,894,804 | 7/1959 | Sawyer et al. | 423/2 |
| 3,449,065 | 6/1969 | Kremer | 423/12 |
| 3,896,045 | 7/1975 | Peeters et al. | 423/12 |
| 3,949,047 | 4/1976 | Cherdron | 423/2 |
| 4,054,320 | 10/1977 | Learmont | 423/2 |
| 4,265,861 | 5/1981 | Cleary et al. | 423/2 |
| 4,265,862 | 5/1981 | White et al. | 423/2 |
| 4,269,706 | 5/1981 | Sondermann | 423/12 |
| 4,374,096 | 2/1983 | Skeaff | 423/2 |

*Primary Examiner*—Edward A. Miller
*Attorney, Agent, or Firm*—Robert F. Delbridge; Arne I. Fors

[57] ABSTRACT

A process for removing radium from a radium-containing aqueous sulphate solution also containing dissolved magnesium at a pH not greater than about 10 comprises treating the solution with a soluble barium salt to precipitate radium as barium radium sulphate. The pH of the solution is raised to at least about 11 to precipitate an insoluble magnesium compound which collects the barium radium sulphate precipitate, and substantially all of the precipitates are separated from the solution.

8 Claims, 1 Drawing Figure

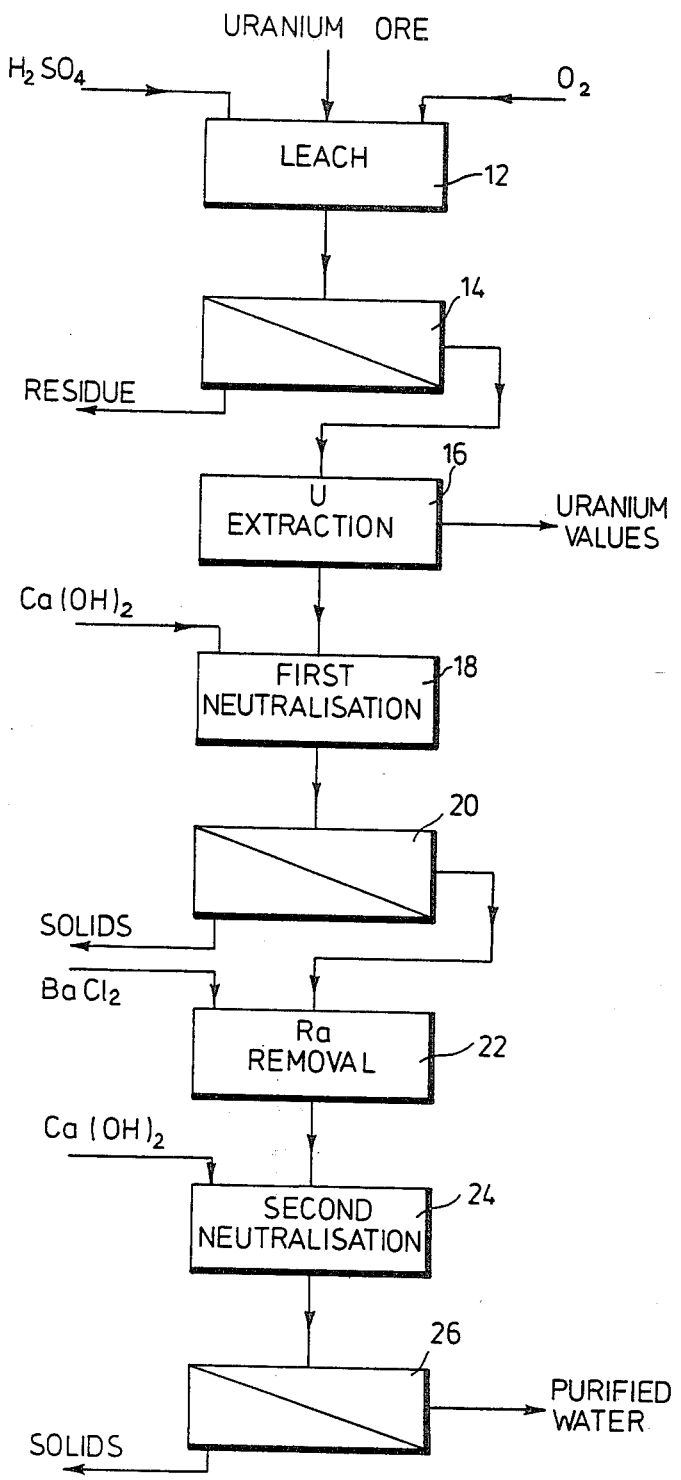

REMOVAL OF RADIUM FROM AQUEOUS SULPHATE SOLUTIONS

This invention relates to the removal of radium from radium-containing aqueous sulphate solutions which also contain dissolved magnesium.

Radium is often present in ores which are mined, and an aqueous solution associated with the ore may consequently contain dissolved radium. Such an aqueous solution may for example be an aqueous solution which is produced in a hydrometallurgical process used to recover a component of the ore. Because such ores usually also contain sulphur or are treated with sulphuric acid solutions to dissolve the desired component, the aqueous solution usually also contains sulphate ions.

Alternatively, such an aqueous solution may be minewater, that is to say water associated with the mine from which the ore is obtained. For example, the minewater may be mine drainage water, such as surface water or ground water which has entered the mine through subterranean channels or fissures, or rain water which has fallen or drained into open pit operations. Other sources of the minewater may be water used for drilling or dust suppressing or even for washing mine vehicles.

Such aqueous radium-containing sulphate solutions usually also contain several other dissolved elements. In the past, it has been conventional practice to first remove most of the other dissolved elements by raising the pH of the solution to about 8 to 10, for example by the addition of lime, to cause these dissolved elements to precipitate as insoluble compounds. The precipitate is removed from the solution, and the remaining solution is then treated with barium chloride to precipitate dissolved radium as barium radium sulphate. However, the barium radium sulphate precipitate is extremely fine and consequently takes a long time to settle, with the result that the solution and precipitate have to be kept in settling ponds for the necessary long time.

It has been proposed to expedite the settling process by the addition of ferric chloride as coagulant, but even with such a coagulant the barium radium sulphate precipitate takes an unreasonably long time to settle. Also, the precipitate itself has an undesirably high radium activity.

In view of strict environmental regulations now in force with respect to such radium-containing aqueous solutions, it is frequently necessary to remove radium from such solutions to reduce the total radium content to a prescribed low level before the solution can be returned to the environment. For example, an acceptable solution may be required to contain less than 10 pCi/L total radium activity and preferably less than 3 pCi/L dissolved radium activity.

The present invention is based on the discovery that the total radium content can be reduced to a satisfactory level within a reasonable time by adding a soluble barium salt to a radium-containing sulphate solution which also contains dissolved magnesium at a pH not greater than about 10 to precipitate radium as barium radium sulphate, raising the pH to at least 11 to precipitate an insoluble magnesium compound which collects the barium radium sulphate precipitate, and separating substantially all of the precipitates from the solution.

The invention enables the total radium content to be efficiently reduced to an acceptable level in a much shorter time than is possible with the known ferric chloride process. Also, the resultant precipitate has less radium activity than the precipitate obtained by the known ferric chloride process because of the greater bulk of the precipitates obtained with the present invention. The pH of the solution may be raised by the addition of an appropriate amount of lime.

Where the radium-containing sulphate solution also containing dissolved magnesium at a pH not greater than about 10 has a dissolved radium activity of at least about 40 pCi/L, and substantially all of the precipitates are allowed to settle before separation from the solution, the precipitates produced in accordance with the invention settle in a relatively short time, and a solution with a total radium activity of less than about 10 pCi/L may readily be produced.

The radium-containing sulphate solution preferably contains at least about 50 mg/L dissolved magnesium.

A radium-containing solution also containing dissolved magnesium and other impurities at a pH below about 7 may be treated, for example by the addition of lime, to raise the pH to a value not greater than about 10 to precipitate some of the magnesium and a substantial proportion of the other impurities, with the precipitate being separated from the solution to provide the radium-containing sulphate solution also containing some dissolved magnesium referred to above.

An embodiment of the invention will now be described, by way of example, with reference to the accompanying drawing which shows a flow diagram of a uranium recovery process.

Referring to the drawing, a uranium-containing ore which also contains radium, magnesium and other impurities is leached in leach step 12 in aqueous sulphuric acid solution under oxidizing conditions. The leach residue is separated from the leach solution in a liquid-solids separation step 14, and is dealt with as desired. The leach solution proceeds to a uranium extraction step 16 where uranium values are extracted in an appropriate manner, for example by solvent extraction.

The remaining solution containing dissolved radium, dissolved magnesium and other dissolved impurities is passed to a first neutralization step 18 where lime is added to raise the pH to about 8, thereby precipitating some of the dissolved magnesium as magnesium hydroxide and also precipitating most of the other impurities so that only trace amounts remain. At this pH however, a significant amount of dissolved magnesium will remain in solution. The precipitate is separated from the solution in a liquid-solids separation step 20, and the separated precipitate is dealt with as desired.

The remaining solution is passed to a radium removal step 22 where barium chloride solution is added to precipitate dissolved radium as barium radium sulphate. Further lime is then added in a second neutralization step 24 to raise the pH to about 11.5 and precipitate substantially all the remaining dissolved magnesium as magnesium hydroxide, with some calcium sulphate precipitate also being formed. The solution is vigorously agitated while the lime is being added, and after the lime addition the solution is gently agitated to ensure adequate mixing of the magnesium and calcium precipitates with the barium radium sulphate precipitate, so that the barium radium sulphate precipitate is collected by the magnesium precipitate.

The precipitates are allowed to settle in a liquid-solids separation step 26, and the barium radium precipitate is collected by and settles with the magnesium hydroxide and calcium sulphate precipitates relatively quickly.

The settled precipitates are then removed and dealt with as desired, leaving effluent which can be discharged to the environment.

It will be noted that impurities precipitated in the first neutralization step 18 at pH 8 are removed before the pH is raised to about 11.5 in the second neutralization step 24, thus avoiding the possibility of redissolution of a precipitate which if present would redissolve at the higher pH.

In another embodiment of the invention, instead of the solution treated in the first neutralization step 18 being solution from the uranium extraction step 16 as in the previous embodiment, the solution treated is minewater, that is to say water which has been associated with the uranium ore during the mining operation.

Examples of the invention will now be described:

EXAMPLE 1

Solution at pH 1 from a uranium extraction step contained dissolved radium and magnesium and other impurities as shown in Table I. It will be noted that the analyses of dissolved magnesium and other impurities are in mg/L and that the activity of dissolved radium is given in pCi/L.

TABLE I

|  | Starting Solution mg/L | Solution neutralized to pH 8 | Effluent pH = 11 | |
|---|---|---|---|---|
|  |  |  | 25 mg/L $Ba^{2+}$ mg/L | 50 mg/L $Ba^{2+}$ mg/L |
| Radium | 10000 (pCi/L) | 48 (pCi/L) | 2.8 (pCi/L) | 2.3 (pCi/L) |
| Aluminum | 1250 | <0.01 | 0.26 |  |
| Calcium | 400 | 575 | 863 | 839 |
| Chromium | 4.6 | 0.3 | 0.24 | 0.27 |
| Cobalt | 52.5 | 0.2 | 0.14 | 0.16 |
| Copper | 101 | 0.09 | 0.07 | 0.07 |
| Iron | 2680 | 0.6 | 0.44 | 0.50 |
| Magnesium | 1180 | 619 | 5.1 | 2.9 |
| Manganese | 35 | 0.46 | 0.02 | 0.02 |
| Molybdenum | 3.0 | 0.42 | 0.30 | 0.30 |
| Nickel | 2850 | 0.52 | 0.13 | 0.18 |
| Phosphorus | 41 | 0.57 | 1.4 | 1.6 |
| Selenium | 7.2 | 0.81 | 0.60 | 0.67 |
| Silicon | 228 | 2.0 | 3.9 | 4.4 |
| Sulphur | 13400 | 1180 | 550 | 550 |
| Titanium | 4.0 | 0.08 | 0.07 | 0.08 |
| Uranium | 3.7 | 3.0 | 2.8 | 2.9 |
| Vanadium | 34 | 0.26 | 0.15 | 0.17 |
| Zinc | 192 | 0.26 | 0.08 | 0.09 |

The solution was treated with lime in a 12 L vessel equipped with an agitator, baffles, air sparge tube, heater and thermometer. The lime was added to the well-stirred, aerated solution at 40° C. to give pH 8. The pH was continuously monitored and more lime was added if required to maintain a stable pH level for 60 minutes. The resulting slurry was filtered to give a cake containing precipitated metal hydroxides and gypsum, and a filtrate solution containing predominantly dissolved calcium and magnesium sulphates, traces of heavy metals, and a radium activity exceeding the 10 pCi/L recommended for effluents, the actual analyses being shown in Table I.

The filtrate at 25° C. was stirred vigorously and 25 or 50 mg/L $Ba^{2+}$ as $BaCl_2$ was added. Vigorous agitation was maintained for 30 minutes. Lime was then added to the vigorously agitated slurry to increase the pH from about 8 to about 11.5. The pH adjustment was rapid, about 5 minutes. After the lime addition, the slurry was gently agitated for 30 minutes in order to flocculate the magnesium hydroxide-gypsum precipitate and allow thorough collection of the fine $(Ba,Ra)SO_4$ precipitate. The final slurry was then divided into two 1 L graduated cylinders for settling tests. After 2 h or 5 h, the top 500 mL of clarified solution was removed for total Ra-226 analysis. The remainder was filtered through 0.45 microns Millipore paper for dissolved Ra-226 analysis.

The analytical results are also given in Table 1. The product solution from the first stage neutralization to pH 8 contained 619 mg/L Mg and 48 pCi/L dissolved Ra-226. After barium chloride addition and neutralization to pH 11.5, the effluent solutions contained 2.8 pCi/L dissolved Ra-226 using 25 mg/L $Ba^{2+}$ addition and 2.3 pCi/L dissolved Ra-226 using 50 mg/L $Ba^{2+}$ addition, below the 3 pCi/L dissolved Ra-226 target.

The total Ra-226 activities of the solution were reduced to 2.4 pCi/L after 5 h for the 25 mg/L $Ba^{2+}$ addition, and to 5.0 pCi/L after 2 h and to 1.9 pCi/L after 5 h for the 50 mg/L $Ba^{2+}$ addition. These activities were well under 10 pCi/L total Ra-226 activity recommended for effluents. Clarify tests results confirmed low suspended solids after 1 h clarification time.

EXAMPLE 2

Decanted solution from stored ore slurry was used to simulate mine water, which analyzed as shown in Table II.

TABLE II

|  | Decant Water pH = 6.22 (mg/L) | Neutralized to pH 8 (mg/L) | Effluent pH = 11.5 | |
|---|---|---|---|---|
|  |  |  | 25 mg/L $BaCl_2$ (mg/L) | 50 mg/L $BaCl_2$ (mg/L) |
| Radium | 2500 (pCi/L) | 2700 (pCi/L) | 8.7 (pCi/L) | 6.6 (pCi/L) |
| Aluminum | <0.01 | <0.01 | 0.14 | 0.14 |
| Calcium | 592 | 898 | 1160 | 1260 |
| Chromium | 0.03 | 0.10 | 0.13 | 0.13 |
| Cobalt | 1.5 | 0.15 | 0.06 | 0.06 |
| Copper | 0.05 | 0.01 | 0.03 | 0.03 |
| Iron | 0.30 | 0.23 | 0.26 | 0.26 |
| Magnesium | 252 | 247 | 4.3 | 4.3 |
| Manganese | 1.8 | 0.49 | 0.01 | <0.01 |
| Molybdenum | 0.44 | 0.07 | 0.05 | 0.05 |
| Nickel | 590 | 94 | 0.28 | 0.17 |
| Phosphorus | 0.56 | 0.54 | 0.88 | 1.1 |
| Selenium | 0.32 | 0.35 | 0.40 | 0.42 |
| Silicon | 31 | 9.2 | 2.1 | 2.2 |
| Sulphur | 0.76 | 0.40 | 0.15 | 0.20 |
| Titanium | 0.02 | 0.03 | 0.04 | 0.05 |
| Uranium | 1.3 | 1.5 | 2.0 | 2.3 |
| Vanadium | 0.09 | 0.07 | 0.08 | 0.10 |
| Zinc | 0.22 | 0.09 | 0.04 | 0.04 |

The dissolved Ra-226 activities of the effluent solutions after barium chloride and lime addition were 8.7 pCi/L (25 mg/L $Ba^{2+}$) and 6.6 pCi/L (50 mg/L $Ba^{2+}$). These values are higher than the 3 pCi/L dissolved Ra-226 target but under the 10 pCi/L total Ra-226 target. Settling tests with 5 h retention yielded 8.4 pCi/L and 4.9 pCi/L total Ra-226 respectively for 25 and 50 mg/L $Ba^{2+}$ addition. These levels are below the 10 pCi/L total Ra-226 target.

EXAMPLE 3

Solution at pH 8 and containing 680 gpl dissolved magnesium and dissolved radium with an activity of 660 pCi/L from a first neutralization step after uranium extraction was subjected to a series of tests in which the solution was passed in a continuous flow at 220 mL/min consecutively through five vessels, with the solution overflowing from one vessel to another. Barium chloride solution was supplied to the first vessel in a continuous flow of 2.8 mL/min to provide a dosage rate of 25 mg/L $Ba^{2+}$, and lime was supplied to the third vessel in a continuous flow at a sufficient rate to maintain a pH of 11 to 11.5 in the overflow from the fifth vessel. The first two vessels were agitated by impellers rotating at 450 rpm, the third vessel was agitated by an impeller rotating at 350 rpm and the fourth and fifth vessels were agitated by impellers rotating at 60 rpm. The retention times of the solution in the various vessels were 44 minutes for the first, second, fourth and fifth vessels which were relatively large, and 0.9 minute in the third vessel which was relatively small. The overflow from the fifth vessel was collected and analyzed.

The final overflow solution had a dissolved radium activity of 2.6 to 4.9 pCi/L. In a settling test, the final solution had a total radium activity of 3.5 to 5.9 pCi/L after 2 hours retention time. The precipitate had a radium activity of 130 pCi/g.

EXAMPLE 4

The tests of Example 3 were repeated by using ferric chloride addition in accordance with the prior art instead of raising the pH in accordance with the present invention. The feed solution had a dissolved radium activity of 548 pCi/L, and the feed rates of the solution and of barium chloride solution and the retention times were the same as in Example 3. Ferric chloride solution was added to the third vessel at a rate of 1.7 mL/min to provide a dosage of 6 mg/L.

In the final solution, dissolved radium had an activity of from 2.1 to 4.7 pCi/L. In settling tests, the total radium activity after 2 hours was over 30 pCi/L, and still exceeded 10 pCi/L after 5 to 8 hours. The precipitate had a radium activity of 11000 pCi/g.

Comparing the results of Examples 3 and 4, it will be seen that the dissolved radium activity of the final solution was of the same order in each case. However, after 2 hours, the total radium activity of the solution, after treatment in accordance with the present invention, was well below the desired level of 10 pCi/L, whereas with the prior art treatment the total radium activity treatment was much higher than 10 pCi/L. The much lower radium activity of the precipitate produced in accordance with the invention compared to the radium activity of the precipitate which was produced in accordance with the prior art will also be noted.

Other embodiments and examples of the invention will be apparent to a person skilled in the art, the scope of the invention being defined in the appended claims.

We claim:

1. A process for removing radium from a radium-containing aqueous sulphate solution also containing dissolved magnesium at a pH not greater than about 10, comprising treating the solution with a soluble barium salt to precipitate radium as barium radium sulphate, raising the pH of the solution to at least about 11 to precipitate an insoluble magnesium compound which collects the barium radium sulphate precipitate, and separating substantially all of the precipitates from the solution.

2. A process according to claim 1 wherein the pH of the solution is raised to at least about 11 with lime.

3. A process according to claim 1 wherein the radium-containing sulphate solution also containing dissolved magnesium at a pH not greater than about 10 has a dissolved radium activity of at least about 40 pCi/L, substantially all of the precipitates are allowed to settle before separation from the solution, and the solution after separation of the settled precipitates has a total radium activity of less than about 10 pCi/L.

4. A process according to claim 1 wherein the radium-containing sulphate solution contains at least about 50 mg/L dissolved magnesium.

5. A process for removing radium from a radium-containing aqueous sulphate solution also containing dissolved magnesium and other impurities at a pH not greater than about 7, comprising raising the pH of the solution to a value not greater than about 10 to precipitate some of the magnesium and a substantial proportion of the other impurities, separating the precipitate from the solution to provide a radium-containing sulphate solution containing dissolved magnesium at a pH not greater than about 10, treating the solution with a soluble barium salt to precipitate radium as barium radium sulphate, raising the pH of the solution of at least about 11 to precipitate an insoluble magnesium compound which collects the barium radium sulphate precipitate, and separating substantially all of the precipitates from the solution.

6. A process according to claim 5 wherein the pH of the solution is raised to the value not greater than about 10 and subsequently to at least about 11 with lime.

7. A process according to claim 5 wherein the radium-containing sulphate solution also containing dissolved magnesium at a pH not greater than about 10 has a dissolved radium activity of at least about 40 pCi/L, substantially all of the precipitates are allowed to settle before separation from the solution, and the solution after separation of the settled precipitates has a total radium activity of less than about 10 pCi/L.

8. A process according to claim 5 wherein the radium-containing sulphate solution at a pH not greater than about 10 contains at least about 50 mg/L dissolved magnesium.

* * * * *